(12) United States Patent
Nagami et al.

(10) Patent No.: US 7,680,931 B2
(45) Date of Patent: Mar. 16, 2010

(54) DATA RELAYING APPARATUS

(75) Inventors: Akihisa Nagami, Yokohama (JP);
Masahiko Nakahara, Machida (JP);
Osamu Takada, Kamakura (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 938 days.

(21) Appl. No.: 10/358,248

(22) Filed: Feb. 5, 2003

(65) Prior Publication Data

US 2004/0078426 A1   Apr. 22, 2004

(30) Foreign Application Priority Data

Oct. 17, 2002   (JP)   ............... 2002-302437

(51) Int. Cl.
*G06F 15/173* (2006.01)

(52) U.S. Cl. ..................................... 709/225

(58) Field of Classification Search ................ 709/225
See application file for complete search history.

(56) References Cited

U.S. PATENT DOCUMENTS

| | | | |
|---|---|---|---|
| 6,003,082 | A | 12/1999 | Gampper et al. |
| 6,170,013 | B1 * | 1/2001 | Murata ........................ 709/229 |
| 6,330,603 | B1 * | 12/2001 | Seki et al. ................... 709/226 |
| 6,332,161 | B1 | 12/2001 | Sasson |
| 6,571,390 | B1 * | 5/2003 | Dunn et al. .................... 725/52 |
| 6,577,628 | B1 * | 6/2003 | Hejza ......................... 370/392 |
| 6,760,306 | B1 * | 7/2004 | Pan et al. ..................... 370/230 |
| 7,003,569 | B2 * | 2/2006 | Garg et al. ................... 709/225 |
| 2001/0044848 | A1 * | 11/2001 | Kikuchi et al. .............. 709/229 |
| 2001/0046212 | A1 * | 11/2001 | Nakajima .................... 370/278 |
| 2002/0013711 | A1 * | 1/2002 | Ahuja et al. ..................... 705/1 |
| 2002/0035642 | A1 * | 3/2002 | Clarke et al. ................. 709/244 |
| 2002/0055980 | A1 |  5/2002 | Goddard |

(Continued)

FOREIGN PATENT DOCUMENTS

EP   1349339   10/2003

(Continued)

OTHER PUBLICATIONS

Vorthman, Jr., "Managing Congestion on the Internet", The Telecommunications Review, pp. 29-40, 1999.*

(Continued)

*Primary Examiner*—Kenny S Lin
*Assistant Examiner*—Julian Chang
(74) *Attorney, Agent, or Firm*—Brundidge & Stanger, P.C.

(57) ABSTRACT

In a service system including client apparatuses for issuing a service request and server apparatuses for receiving a service request and providing service, there is provided a data relaying apparatus for relaying data communication between them. In response to a service request, the data relaying apparatus establishes a connection from the client apparatus to the server apparatus (destination). The data relaying apparatus relays data communication between the client apparatus and the server apparatus by using the established connection. The data relaying apparatus manages a number of connections established to each of the server apparatuses. In response to a service request, the data relaying apparatus accepts or refuses the service request so as to make a number of connections to the server apparatus equal to or less than a predetermined number, and notifies a user refused relaying of a service request that relaying is possible.

20 Claims, 12 Drawing Sheets

U.S. PATENT DOCUMENTS

| | | | |
|---|---|---|---|
| 2002/0143922 A1* | 10/2002 | Tanimoto | 709/223 |
| 2003/0041146 A1* | 2/2003 | Davis et al. | 709/227 |
| 2003/0187710 A1* | 10/2003 | Baumer et al. | 705/8 |
| 2003/0188013 A1* | 10/2003 | Nishikado et al. | 709/238 |
| 2004/0054574 A1* | 3/2004 | Kaufman et al. | 705/14 |
| 2005/0210243 A1* | 9/2005 | Archard et al. | 713/160 |

FOREIGN PATENT DOCUMENTS

| | | |
|---|---|---|
| JP | 2002-312424 | 11/2001 |
| JP | 2002-149519 | 5/2002 |
| JP | 2002-199317 | 7/2002 |
| JP | 2002-223226 | 8/2002 |
| JP | 2002-269061 | 9/2002 |
| JP | 2002-288497 | 10/2002 |

OTHER PUBLICATIONS

RFC2616.

* cited by examiner

FIG.9

21 ACCESS MANAGEMENT TABLE

| | | ACCESS RESTRICTION | | | | | | | |
|---|---|---|---|---|---|---|---|---|---|
| DESTINATION URL | CURRENT NUMBER OF CONNECTIONS | THE NUMBER OF START OF CONNECTIONS | THE NUMBER OF END CONNECTIONS | STATE | CURRENT NUMBER OF RESERVING USERS | THE NUMBER OF WAITING USERS | SERVICE PROVISION TIME INFORMATION | PRIVILEGED SERVICE PROVISION TIME | THE NUMBER OF RE-SCHEDULING TIMES |
| http://dst1/img/ | 15 | 20 | 10 | RESTRICTION | 0 | 0 | 9:00 TO 17:00 EVERYDAY | 60 MINUTES | 3 |
| http://dst2/cgi-bin/ | 5 | 5 | 3 | CANCEL | 4 | 10 | UNTIL 2002/09/30 | 120 MINUTES | 4 |
| ... | ... | ... | ... | ... | ... | ... | ... | ... | ... |
| http://dstN/index.htm/ | 85 | 100 | 70 | RESTRICTION | 0 | 0 | - | 40 MINUTES | 0 |
| 2102 | 2103 | 2104 | 2105 | 2106 | 2107 | 2108 | 2109 | 2110 | 2111 |

2101 ENTRY

FIG.10

22 USERS' INFORMATION MANAGEMENT TABLE

| | 2202 USER'S ID | 2203 PASSWORD | 2204 NOTIFICATION METHOD | 2205 NOTIFICATION DESTINATION | 2206 PRIVILEGE | 2207 THE NUMBER OF TIMES OF ACCESS | 2208 ACCESS REFUSAL TIME | 2209 POST-NOTIFICATION AVERAGE ACCESS TIME | 2210 DESIRED SERVICE TIME ZONE | 2211 DESIRED NOTIFICATION TIME | 2212 ACCESS MANAGEMENT TABLE ENTRY OF DESTINATION URL | 2213 DESIRED NUMBER OF TIMES OF NOTIFICATION | 2214 NOTIFICATION TIME | 2215 PRIVILEGED SERVICE TIME ZONE | 2216 THE NUMBER OF TIMES OF NOTIFICATION |
|---|---|---|---|---|---|---|---|---|---|---|---|---|---|---|---|
| 2201 ENTRY | aaa | XXX | MAIL | aaa@aaa.bbb.com | 5 | 10 | 2002/01/01 12:00:10 | 30min | 13:00~15:00 | 13:00 | ENTRY OF ACCESS MANAGEMENT TABLE | 1 | 13:00 | 13:00~14:00 | 1 |
| 2201 | bbb | YYY | IM | #1234567 | 0 | 15 | 2002/02/02 12:34:00 | 1h | 19:00~21:00 | 20:00 | ENTRY OF ACCESS MANAGEMENT TABLE | 3 | - | - | 0 |
| 2201 | ... | ... | ... | ... | ... | ... | ... | ... | ... | ... | ... | ... | ... | ... | ... |
| 2201 | nnn | ZZZ | MAIL | nnn@nnn.co.jp | 2 | 5 | 2002/03/03 15:30:20 | 5min | 19:00~22:00 | - | - | 1 | 19:20 | 19:20~20:20 | 1 |
| 2201 | - | - | IM | #98765 | 0 | - | 2002/04/04 10:05:10 | - | - | - | - | 1 | - | - | 0 |

FIG.15

23 SOURCE ADDRESS / PRIVILEGE CONVERSION TABLE

| SOURCE ADDRESS | PRIVILEGE |
|---|---|
| 192.168.x.x | 4 |
| src1.xxx.xxx | 7 |
| ⋮ | ⋮ |
| src2.yyy.yyy | 3 |

2301 ENTRY (rows); 2302, 2303 (columns)

FIG.16

24 SOURCE ADDRESS AND DESTINATION ADDRESS / PRIVILEGE CONVERSION TABLE

| DESTINATION ADDRESS | SOURCE ADDRESS | PRIVILEGE |
|---|---|---|
| dst_xx | 192.168.x.x | 1 |
| dst_yy | src1.xx.xx | 6 |
| ⋮ | ⋮ | ⋮ |
| dst_zz | src2.yy.yy. | 2 |

2401 ENTRY (rows); 2402, 2403, 2404 (columns)

FIG.17

25 DESTINATION ADDRESS / PRIVILEGE CONVERSION TABLE

| DESTINATION ADDRESS | PRIVILEGE |
|---|---|
| dst_xxx | 3 |
| dst_yyy | 0 |
| ⋮ | ⋮ |
| dst_zzz | 5 |

2501 ENTRY (rows); 2502, 2503 (columns)

DATA RELAYING APPARATUS

This application claims priority based on a Japanese patent application, No. 2002-302437 filed on Oct. 17, 2002, the entire contents of which are incorporated herein by reference.

BACKGROUND OF THE INVENTION

The present invention relates to a data communication method between a client apparatus and a server apparatus using a data relaying apparatus, and Web access service using such a data communication method.

As the Internet rapidly spreads, services provided heretofore at windows of business offices, such as ticket reservations or bank and securities transactions, are now provided in the form of access to a Web server via the Internet.

Details of and how to use HTTP (Hypertext Transfer Protocol), which is a communication protocol utilized while accessing the Web server are described in detail in, for example, R. Fielding et al., RFC 2616, "Hypertext Transfer Protocol—HTTP/1.1", June 1999, The Internet Society, which is available on the Internet.

In services, such as ticket reservations or bank and securities transactions, the concentration of service requests according to time is severe. Furthermore, since database access is needed, distribution of processing is difficult. This results in a problem that eventually access concentration occurs on specific Web servers that provide these services. If access concentration on a Web server occurs and its load rapidly becomes heavy, typically the processing performance of the Web server becomes extremely low as compared with that at the time of low load. As a result, a backlog of service requests is further increased. In the worst situation, service interruption occurs.

Furthermore, in the situation where access concentration has occurred, all service requests cannot be processed satisfactorily and consequently even service requests of important users are kept waiting in the same way as ordinary users with no distinction. In addition, even if a service request is issued later, the service might be given accidentally or the service might not be given after a long time wait. Especially in the latter case, the user repeats re-execution over and over again and further access concentration occurs, resulting in a heavier load.

In order for a service provider to solve the above-described problems, in the conventional situation, it is necessary to enhance the performance of a server apparatus at the time when the largest number of access requests is expected to occur, and a heavy investment is needed.

SUMMARY OF THE INVENTION

The present invention provides a technique for reducing the load imposed on a server by avoiding access concentration on a specific server apparatus, and suppressing the degradation of service performance.

The present invention further provides a technique for providing a service in a privileged manner to a user, who has been denied the provision of a service, in order to avoid access concentration after the congestion state has been eliminated.

In one aspect, a data relaying apparatus of the present invention includes, in a configuration in which a request from a client apparatus is sent to a server apparatus via a data relaying apparatus: a connection establishment unit for establishing a connection to a destination server apparatus in response to an access request from a client apparatus to a server apparatus and for establishing a connection between the client apparatus and the server apparatus; and a data relaying unit for relaying data communication between the client apparatus and the server apparatus by using the established connection.

Furthermore, the data relaying apparatus includes: an access management unit for managing a number of connections established to each of the server apparatus; a unit responsive to an access request issued to a server apparatus by a client apparatus for refusing the access request so as to make a number of connections to the server apparatus equal to or less than a predetermined number of connections in accordance with an order issued by the access management unit; and a notification unit for notifying a user who has been refused relaying of an access request that relaying is possible. The notification may be conducted, for example, in a time zone of service desired by the user, at the time (or in a time zone) of notification desired by the user, or when congestion has been eliminated.

As for a request from a user notified by the data relaying apparatus that relaying is possible, the data relaying apparatus includes a unit for establishing a connection to the server apparatus and conducting relaying in a privileged manner and a unit for imposing a restriction on a time period during which the relaying is provided with privilege.

On the other hand, the data relaying apparatus includes a unit to be used by the user to specify a desired service provision time zone, time at which the user desires to be notified, and a maximum number of times of being urged, by notification, to access, and a unit for notifying the user that service can be provided on the basis of the desired service provision time zone, time at which the user desires to be notified, and the maximum number of times of being urged, by notification, to access.

As for a privileged service provision time zone, the data relaying apparatus includes a unit for scheduling the privileged service provision time zone a plurality of times, even if access is not conducted in the privileged service provision time zone once set, and for conducting notification.

The data relaying apparatus includes a unit for setting a service provision term and a service provision time zone of the server apparatus, and for refusing relaying of a request if a request is issued by the client apparatus when the server apparatus is not providing service.

Furthermore, the data relaying apparatus includes a unit for providing a registration page of information concerning notification when sending a request refusal message to the client apparatus as a response, and for urging the user to register information.

The data relaying apparatus includes a privilege setting unit for determining privilege of a service request based on an address of the client apparatus, or a combination of the address of the client apparatus and an address of the destination server apparatus, and a unit for processing a request of an important user in a privileged manner by relaying a service request according to privilege of each service request determined from authentication information of the user.

According to the present invention, it becomes possible to avoid access concentration to a server apparatus and prevent service from falling.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 9 is a configuration diagram of an access management table according to an embodiment;

FIG. 10 is a configuration diagram of a users' information management table according to an embodiment;

FIG. 15 is a configuration diagram of a source address/privilege conversion table according to an embodiment;

FIG. 16 is a configuration diagram of a source address and destination address/privilege conversion table according to an embodiment; and FIG. 17 is a configuration diagram of a destination address/privilege conversion table according to an embodiment.

DESCRIPTION OF THE PREFERRED EMBODIMENTS

Hereafter, an embodiment of the present invention will be described with reference to the drawings.

Figure 1:
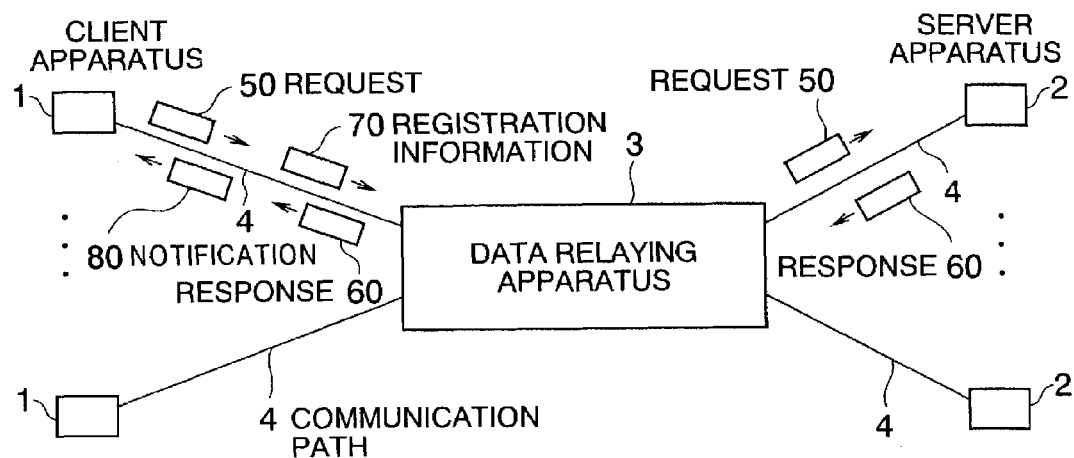
FIG. 1 is a diagram showing a configuration of a system using a data relaying apparatus of an embodiment.

FIG. 1 is a diagram showing a configuration of a system using a data relaying apparatus of the present embodiment.

In the configuration of the present embodiment, client apparatuses 1 and server apparatuses 2 are connected to each other via at least one data relaying apparatus 3 and communication paths 4. The data relaying apparatus 3 relays data communication between a client apparatus 1 and a server apparatus 2. That is, a service request 50 (hereafter simply referred to as request 50) issued by a client apparatus 1 toward a server apparatus 2 is necessarily sent via at least one data relaying apparatus 3. A response 60 provided by the server apparatus 2 to the client apparatus 1 is also sent via the data relaying apparatus 3. The communication path 4 referred to herein need not necessarily coincide with a physical communication line, but may be a logical communication path implemented on a physical communication line. The request 50 and the response 60 in the data communication are passed through communication paths 4 and processed by the apparatuses.

Figure 2:
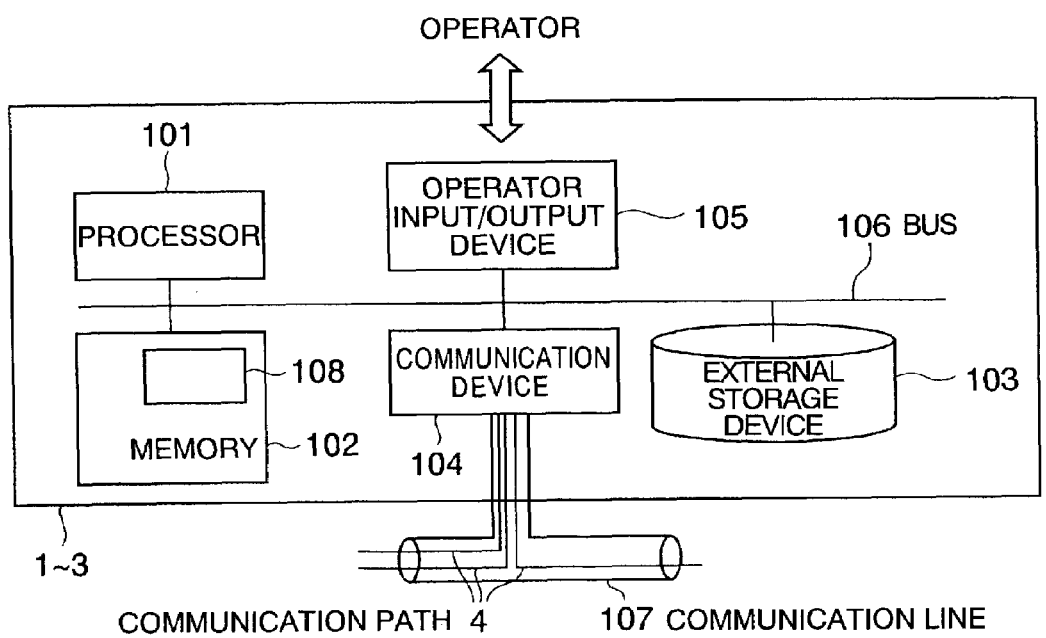
FIG. 2 is a physical configuration diagram of a client apparatus, a server apparatus, and a data relaying apparatus according to an embodiment.

FIG. 2 shows an example of a physical configuration of each of the client apparatus 1, the server apparatus 2, and the data relaying apparatus 3. As shown in FIG. 2, each of these apparatuses may be physically a typical information processing apparatus. Specifically, each information processing apparatus includes, for example, a processor 101, a memory 102, an external storage mechanism 103, a communication mechanism 104, an operator input/output mechanism 105, and an internal communication line 106, such as a bus, for connecting them.

The processor 101 executes an information processing program 100 stored in the memory 102. Besides the information processing program 100, the memory 102 also holds various data referred to by the information processing program 100. The external storage mechanism 103 holds the information processing program 100 and various data in a nonvolatile form. The information processing program 100 executed on the processor 101 gives an order to the external storage mechanism and loads necessary programs and data into the memory 102, or conversely stores the information processing program 100 and data stored in the memory 102 into the external storage mechanism 103. The information processing program 100 may be previously stored in the external storage mechanism 103. Or as occasion demands, the information processing program 100 may be introduced from an external apparatus via a portable storage medium or a communication medium.

The communication mechanism 104 is connected to a communication line 107. According to an order from the information processing program 100, the communication mechanism 104 transmits data to another information processing apparatus or communication device, and conversely receives data from another information processing apparatus or communication device, and stores the data in the memory 102. The logical communication path 4 between apparatuses is implemented through a physical communication line 107 via the present communication mechanism.

The operator input/output mechanism 105 literally conducts data inputting/outputting for the user. The internal communication line 106 is provided for the processor 101, the memory 102, the external storage mechanism 103, the communication mechanism 104, and the operator input/output mechanism 105 to conduct communication with each other. The internal communication line 106 is, for example, a bus.

The client apparatus 1, the server apparatus 2, and the data relaying apparatus 3 need not necessarily have physically different configurations. Differences among their functions may be implemented by information processing programs 100 executed on respective apparatuses.

In the following description of the embodiment, each of components in the present embodiment are represented in the term of "unit." However, each "unit" represents a logical configuration, and it may be implemented by a physical mechanism or may be one function implemented by an information processing program. Furthermore, the client apparatus 1, the server apparatus 2, and the data relaying apparatus 3 also need not be respectively independent physical apparatuses, but one apparatus may implement simultaneously functions of a plurality of apparatuses, i.e., the client apparatus 1, the server apparatus 2, and the data relaying apparatus 3. In addition, each processing unit need not be formed of one apparatus, but may be formed of different apparatuses.

Figure 3:
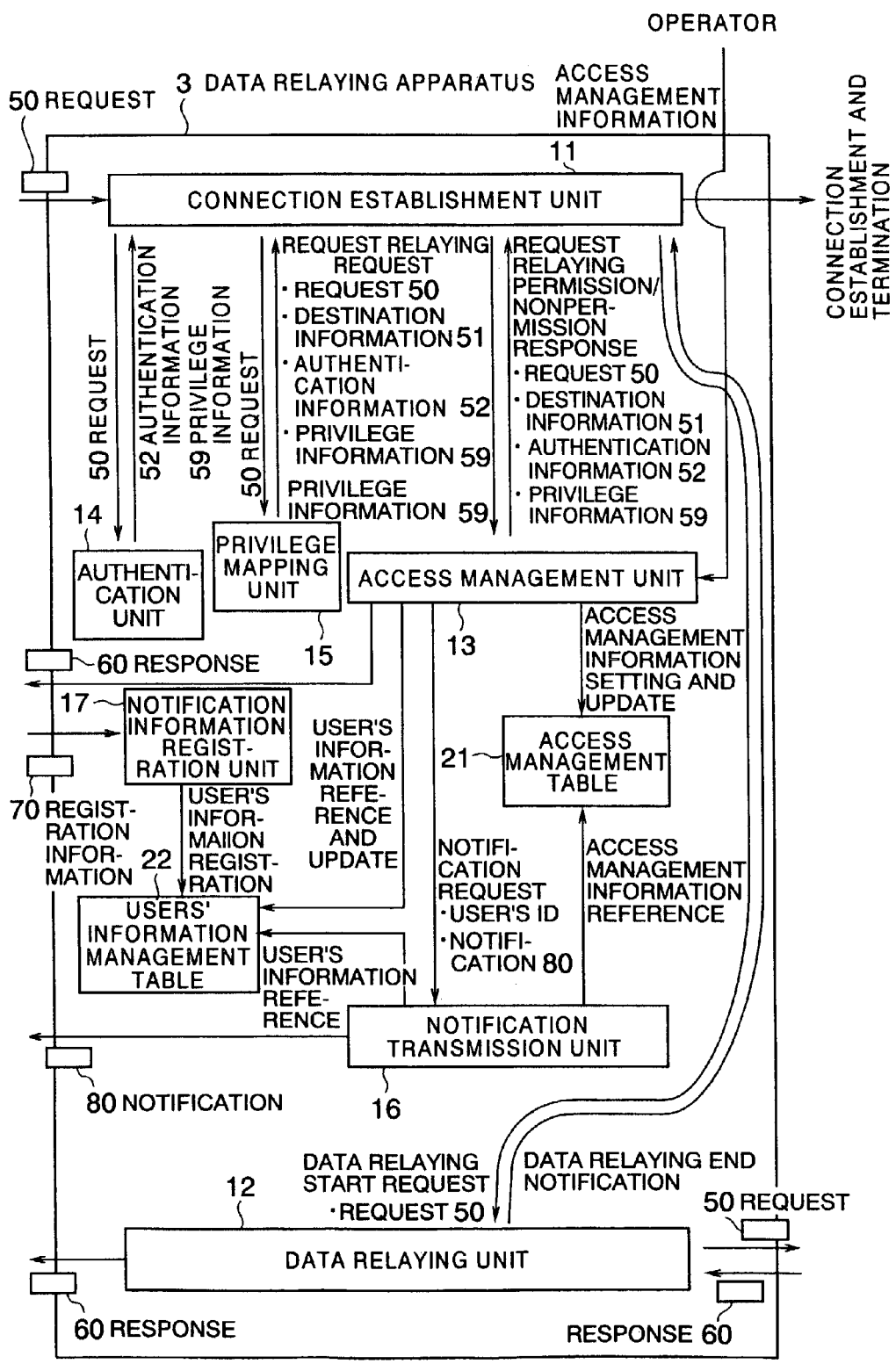
FIG. 3 is a configuration diagram of a data relaying apparatus according to an embodiment.

FIG. 3 is a configuration diagram of the data relaying apparatus 3 of the present embodiment. The data relaying apparatus 3 of the present embodiment includes a connection establishment unit 11 for managing connection relaying, a data relaying unit 12 for relaying data communication, an access management unit 13 for managing access issued by users, an authentication unit 14, a privilege mapping unit 15, a notification transmission unit 16, a notification information registration unit 17, an access management table 21, and a users' information management table 22.

FIG. 9 shows a configuration example of the access management table 21 of the present embodiment. The access management table 21 is a table using a destination URL field 2102 as a key. The access management table 21 is used to manage access to a specific destination URL indicated by the destination URL field 2102.

Besides the destination URL field 2102, each entry 2101 of the access management table 21 of the present embodiment includes a current connection number field 2103 for representing the number of requests that are being relayed to the server, an access restriction start connection number field 2104 for representing the number of connections for which an access restriction state is started, an access restriction end connection number field 2105 for representing the number of connections for which an access restriction state is ended, an access restriction state field 2106 for representing whether access restriction is now in force or canceled, a current reserving users' number field 2107 for representing the number of notifications conducted for access permission in the current time zone, a waiting users' number field 2108 for representing the number of users who are refused to access and wait for notification, a service provision time information field 2109 for representing an accessible time zone of a server apparatus 2, a privileged service provision time 2110, and number of rescheduling times 2111 for indicating up to how many times re-notification should be conducted in the case where access is not conducted in an accessible time zone even if an access permission notification is sent to a user waiting for the notification.

FIG. 10 shows a configuration example of the users' information management table 22 of the present embodiment. The users' information management table 22 is a table using a users' ID field 2202 as a key. The users' information management table 22 is used to manage access of users indicated in the users' information management table 22.

Besides the users' ID field 2202, each entry 2201 of the users' information management table 22 of the present embodiment includes a password field 2203, a notification method field 2204 for representing a notification method, a notification destination field 2205 for representing destination at the time of notification, a privilege field 2206 for representing privilege of a user, a number of access times field 2207 for representing the number of times the user has accessed upon receiving a notification 80, an access refusal time field 2208 for representing time when user's access has been refused, a post-notification average access time field 2209 for representing an average time required until the user accesses after a notification is sent, a desired service time zone field 2210 for representing a time zone during which the user desires to receive service, a desired notification time field 2211 for representing time at which the user desires to receive a notification, a destination URL access management table entry field 2212 for representing an entry that corresponds to a destination URL of the access management table 21 of the destination URL accessed by the user, a desired number of times of notification field 2213, a notification time field 2214, a privileged service time zone field 2215, and a number of times of notification field 2216.

Figure 11:
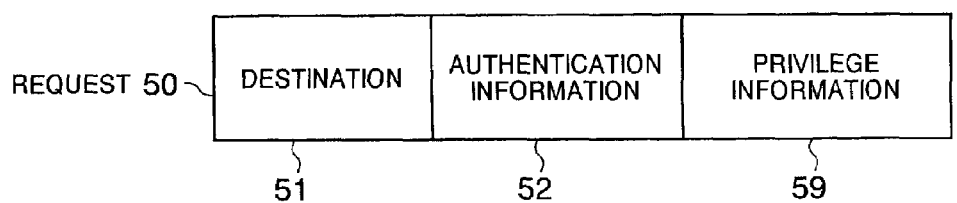
FIG. 11 is a configuration diagram of a request issued by a client apparatus according to an embodiment.

FIG. 11 shows a configuration example of a request 50 issued by the client apparatus 1 of the present embodiment. The request 50 issued by the client apparatus 1 includes a destination 51, authentication information 52, and privilege information 59. The authentication information 52 includes a pair composed of a user's ID and a password.

Figure 12:
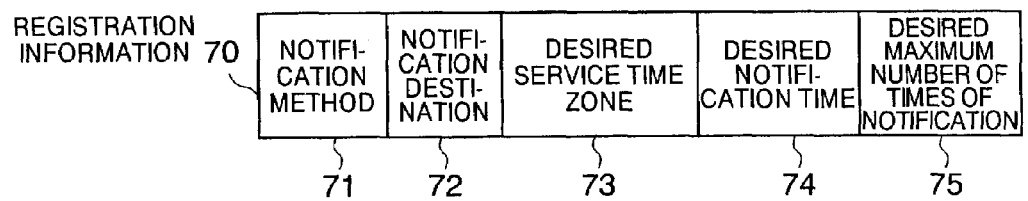
FIG. 12 is a configuration diagram of registration information issued by a client according to an embodiment.

FIG. 12 shows a configuration example of registration information 70 supplied from the client apparatus 1 of the present embodiment. The registration information 70 supplied from the client apparatus 1 includes a notification method 71, notification destination 72, a desired service time zone 73, a desired notification time 74, and a desired maximum number of notification times 75.

Figure 13:
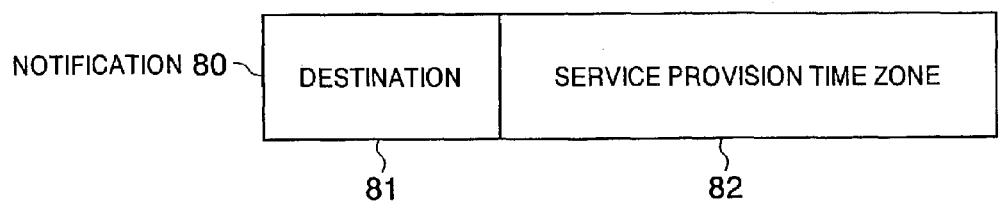
FIG. 13 is a configuration diagram of a notification for a client according to an embodiment.

FIG. 13 shows a configuration example of a notification 80 sent to the client apparatus 1 of the present embodiment. The notification 80 sent to the client apparatus 1 includes destination 81 and a privileged service provision time zone 82.

FIG. 15 shows a configuration example of a source address/privilege conversion table 23 of the present embodiment. The source address/privilege conversion table 23 is utilized to manage privilege of pertinent requests by using a source address field 2302 as a key.

FIG. 16 shows a configuration example of a source address and destination address/privilege conversion table 24 of the present embodiment. The source address and destination address/privilege conversion table 24 is utilized to manage privilege of a request pertinent to a destination address field 2402 and a source address field 2403 by using the destination address field 2402 as a key.

FIG. 17 shows a configuration example of a destination address/privilege conversion table 25 of the present embodiment. The destination address/privilege conversion table 25 is utilized to manage privilege of pertinent requests by using a destination address field 2502 as a key.

Hereafter, operation of the data relaying apparatus 3 shown in FIG. 3 will be described.

The connection establishment unit 11 first receives a request 50 from a client apparatus 1, and establishes a connection with the client apparatus 1. And in accordance with destination information 51 contained in the request 50, the connection establishment unit 11 establishes connection with a server apparatus of a destination, and establishes a connection between the client apparatus 1 and the server apparatus 2.

The data relaying unit 12 relays data communication between the client apparatus 1 and the server apparatus 2. By using the connection established by the connection establishment unit 11, the data relaying unit 12 relays the request 50 issued by the client apparatus 1 to the server apparatus 2. And the data relaying unit 12 relays a response 60 received from the server apparatus 2 to the client apparatus 1. At that time, the data relaying unit 12 sets privilege in a packet (for example, an IP packet) of data to be relayed and relays data as occasion demands, corresponding to privilege 59 of the request 50 obtained by the privilege mapping unit 15.

The access management unit 13 receives the request 50 and the privilege 59 from the connection establishment unit 11, refers to the access management table 21, makes a decision as to whether a destination URL of the request 50 is not allowed to be accessed, and sends a result of the decision as a response. If the destination URL of the request 50 cannot be accessed, the access management unit 13 updates the users' information management table 22 and the access management table 21.

Furthermore, the access management unit 13 periodically refers to the access management table 21 and the users' information management table 22. In order to send a notification 80 to a user who can access, the access management unit 13 delivers a user's ID and the notification 80 to the notification transmission unit 16 as a notification request.

The authentication unit 14 determines whether a pair composed of a user's ID and a password in the authentication information 52 coincides with the user's ID field 2202 and the password field 2203 of the users' information management table 22. The pair is provided together with the request 50 by utilizing proxy-authorization field information prescribed in HTTP/1.1.

The privilege mapping unit 15 determines the privilege 59 of each request 50 on the basis of an address of the source client apparatus 1, an address of the destination server apparatus 2, and information provided together with the request 50.

The notification transmission unit 16 receives the user's ID and the notification 89 as a notification request from the access management unit 13, refers to the notification method 2204 and the notification destination field 2205 of the client apparatus 1 having the user's ID in the users' information management table 22 by using the user's ID as a key, and transmits a notification 80 to the client apparatus 1 that the access is possible.

The notification information registration unit 17 receives the registration information 70 input on a registration page, which is provided to the client apparatus 1 by the access management unit 13, as shown in FIG. 12, and conducts processing to register the registration information 70 in the users' information management table 22.

Figure 4:
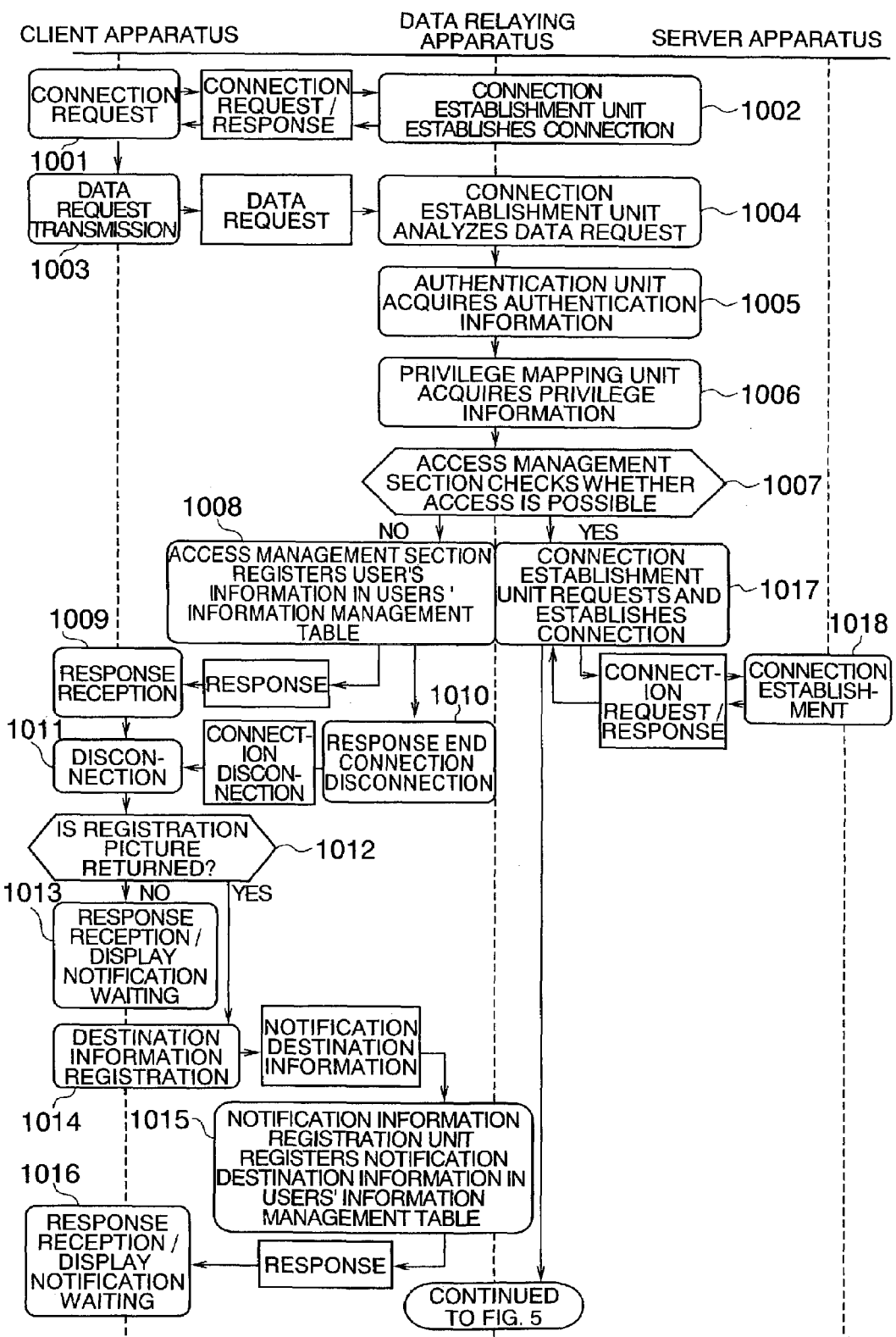
FIG. 4 is a first processing flow diagram showing a flow of relaying processing in a data relaying apparatus according to an embodiment.
Figure 5:
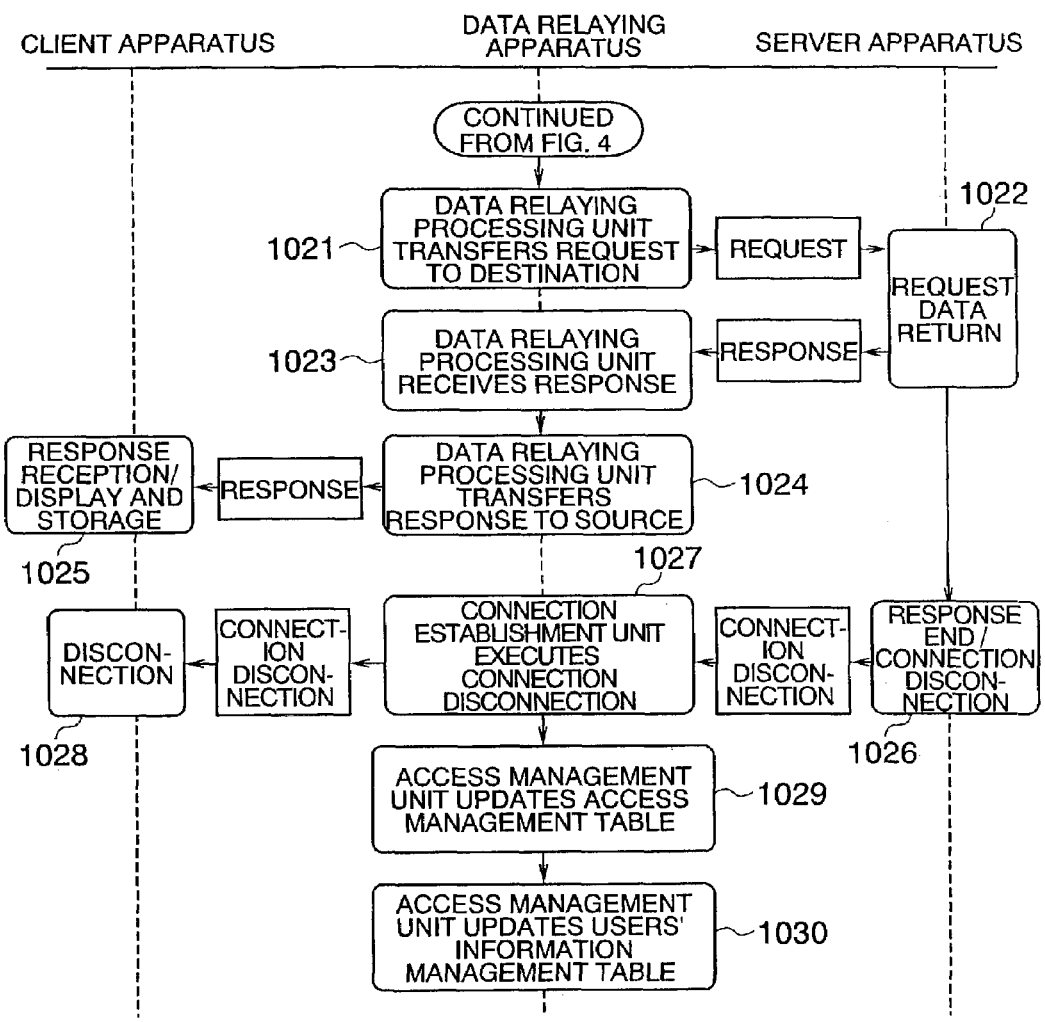
FIG. 5 is a second processing flow diagram showing a flow of relaying processing in a data relaying apparatus according to an embodiment.

FIGS. 4 and 5 are processing flow diagrams showing a flow of relaying processing in the data relaying apparatus 3 of the present embodiment.

With reference to FIG. 4, in accordance with operation of the user, the client apparatus 1 requests establishment of a connection to the destination server apparatus 2 via the data relaying apparatus 3 (processing 1001). As for this request, the client apparatus 1 may issue the request to the data relaying apparatus 3 with the consciousness of passing through the data relaying apparatus 3, or a router for relaying data communication may transfer the request 50 directed to the destination server apparatus 2 to the data relaying apparatus 3 without being conscious of the client apparatus 1.

Upon receiving the connection establishment request 50 from the client apparatus 1, the connection establishment unit 11 in the data relaying apparatus 3 establishes a connection with the client apparatus 1 (processing 1002).

Upon establishment of the connection, the client apparatus 1 transmits the request 50 directed to the server apparatus 2 to the data relaying apparatus 3 by using the connection (processing 1003).

The connection establishment unit 11 in the data relaying apparatus 3 receives the request 50, and extracts the destination information 51 contained in the request 50 (processing 1004).

The connection establishment unit 11 delivers the received request 50 to the authentication unit 14. The authentication unit 14 refers to the users' information management table 22, and determines whether the user who has issued the request is previously registered in the users' information management table 22 (processing 1005).

The connection establishment unit 11 delivers the received request 50 to the privilege mapping unit 15. The privilege mapping unit 15 determines the privilege 59 of each request 50 on the basis of the address of the source client apparatus 1, the address of the destination server apparatus 2, and information provided together with the request 50 (processing 1006).

The connection establishment unit 11 delivers the request 50, the destination information 51, and the privilege 59 of the request to the access management unit 13, and the access management unit 13 determines whether the access is possible (processing 1007).

If the access is determined in the processing 1007 to be impossible, then the access management unit 13 registers user's information in the users' information management table 22, and sends a request refusal message formed of an error message or a registration page as a response 60 (processing 1008).

The client apparatus 1 receives the response 60 from the access management unit 13, and displays the response 60 for the user (processing 1009).

When the transmission of the response 60 is finished, the data relaying apparatus 3 conducts disconnection processing of the connection to the client apparatus 1 established in the processing 1002 (processing 1010).

Upon disconnection of the connection in the data relaying apparatus 3, the client apparatus 1 disconnects the connection (processing 1011).

The client apparatus 1 determines whether the registration page has been returned as the response 60 (processing 1012).

If the error message is returned as the response 60, then the client apparatus 1 displays an error, and the user waits for the notification 80 in accordance with contents of the error display (processing 1013).

If the registration page is returned as the response 60, then the client apparatus 1 displays the registration page and the user inputs and transmits information in accordance with the registration page. As a result, the registration information 70 can be registered (processing 1014).

The notification destination information transmitted in the processing 1014 is registered in the users' information management table 22 by the notification information registration unit 17 (processing 1015).

After the registration, a response 60 of registration completion is returned, and the client apparatus 1 receives the response 60 and displays the response 60. The user waits for the notification 80 in accordance with the response 60 (processing 1016).

If the access is determined in the processing 1007 to be possible, then the connection establishment unit 11 issues a connection request to the destination server apparatus 2 or a relaying apparatus (processing 1017).

If there is a response 60 of connection establishment from the server apparatus 2 in response to the connection request 50 issued in the processing 1017, the connection is established.

With reference to FIG. 5, upon establishment of the connection, control is transferred to the data relaying unit 12. By using the connection established in the processing 1017, the data relaying unit 12 relays the request 50 to the destination server apparatus 2. At that time, the data relaying unit 12 may alter the information of the IP packet according to the privilege 59 and relay the data (processing 1021).

Upon receiving the request 50, the server apparatus 2 processes the request 50, and returns a response 60 by using the connection established in the processing 1017 (processing 1022).

In the data relaying apparatus 3, the data relaying unit 12 receives the response 60 from the server apparatus 2 (processing 1023).

The data relaying apparatus 3 relays the received response 60 to the client apparatus 1 by using the connection established in the processing 1002. At that time, the data relaying apparatus 3 may alter the information of the IP packet according to the privilege 59 and relay the data (processing 1024).

The client apparatus 1 receives the response 60 and displays and stores the received response 60 (processing 1025).

Upon completion of the transmission of the response 60, the server apparatus 2 disconnects the connection established in the processing 1017 (processing 1026).

When the server apparatus 2 has disconnected the connection, in the data relaying apparatus 3, control is transferred from the data relaying unit 12 to the connection establishment unit 11, and the connection establishment unit 11 disconnects the connection established in the processing 1017. When the relaying of the response 60 to the client apparatus 1 is finished, the connection establishment unit 11 conducts disconnection processing of the connection to the client apparatus 1 established in the processing 1002 (processing 1027).

When the data relaying apparatus 3 has disconnected the connection, the client apparatus 1 disconnects the connection (processing 1028).

If an access management table entry 2101 corresponding to the disconnected connection exists after the data relaying apparatus 3 has disconnected the connection to the server apparatus 2, then the data relaying apparatus 3 decreases a value of the current connection number field 2103 by one (processing 1029).

Furthermore, if the request 50 is a request issued based on the notification 80, then the data relaying apparatus 3 clears values in the notification time field 2214 and the privileged service time zone field 2215 of an entry of the user in the users, information management table 22 (processing 1030).

Figure 14:
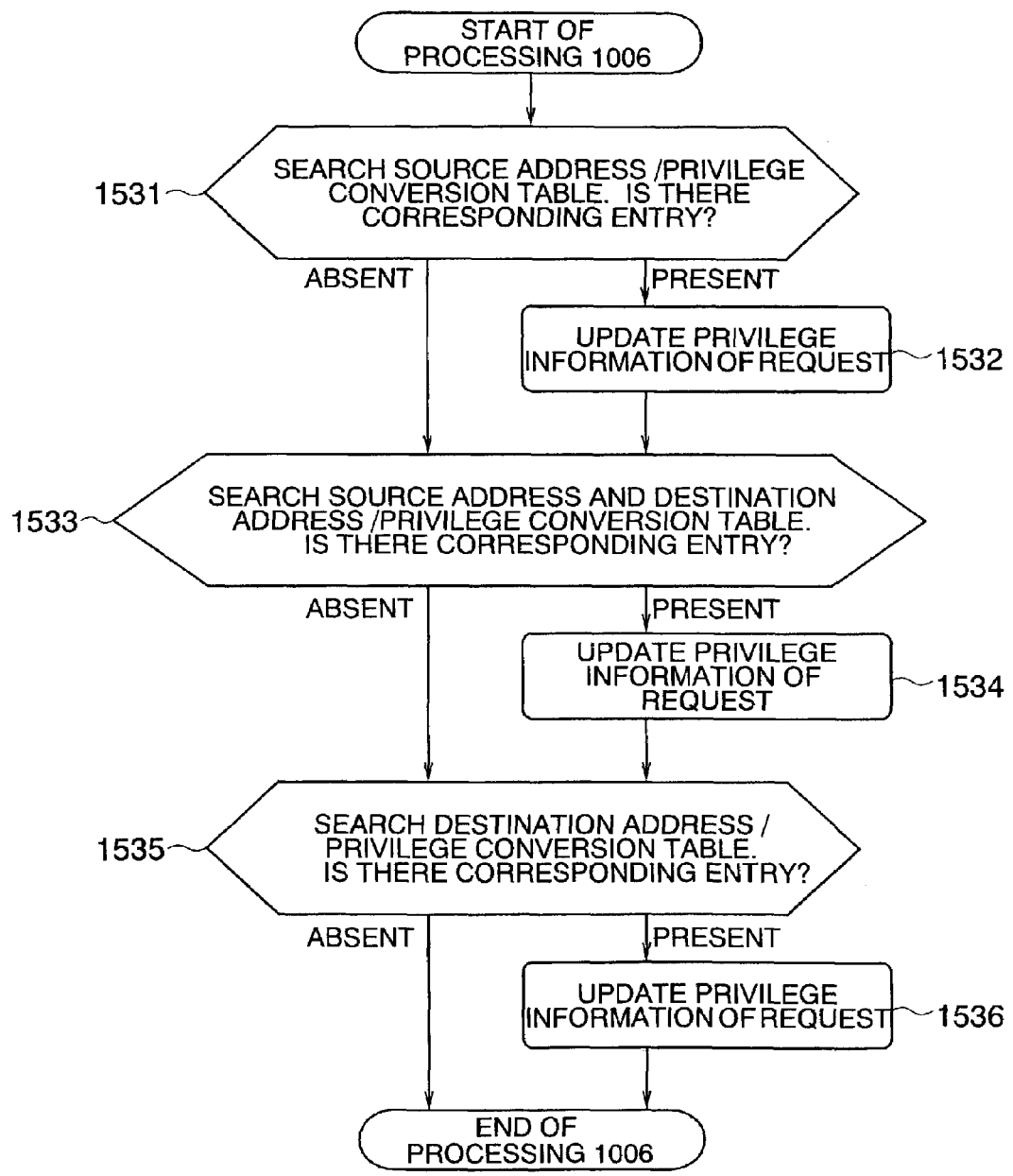
FIG. 14 is a flow diagram of privilege determination processing conducted by a privilege mapping unit according to an embodiment.

FIG. 14 shows a processing flow of an embodiment in which the privilege mapping unit 15 determines privilege in the processing 1006 in FIG. 4.

First, in order to obtain an entry corresponding to a source address of a request 50 delivered from the connection establishment unit 11, the privilege mapping unit 15 searches the source address/privilege conversion table 23 (processing 1531). If there is a corresponding entry, then the privilege mapping unit 15 sets the value of the privilege field 2303 in the privilege information 59 of the request 50 (processing 1532).

Subsequently, in order to obtain an entry corresponding to the source address of the request 50, the privilege mapping unit 15 searches the source address and destination address/privilege conversion table 24 (processing 1533). If there is a corresponding entry, then the privilege mapping unit 15 sets the value of the privilege field 2404 in the privilege information 59 of the request 50 (processing 1534).

Furthermore, in order to obtain an entry corresponding to the source address of the request 50, the privilege mapping unit 15 searches the destination address/privilege conversion table 25 (processing 1535). If there is a corresponding entry, then the privilege mapping unit 15 sets the value of the privilege field 2503 in the privilege information 59 of the request 50 and finishes the processing (processing 1536).

Figure 7:
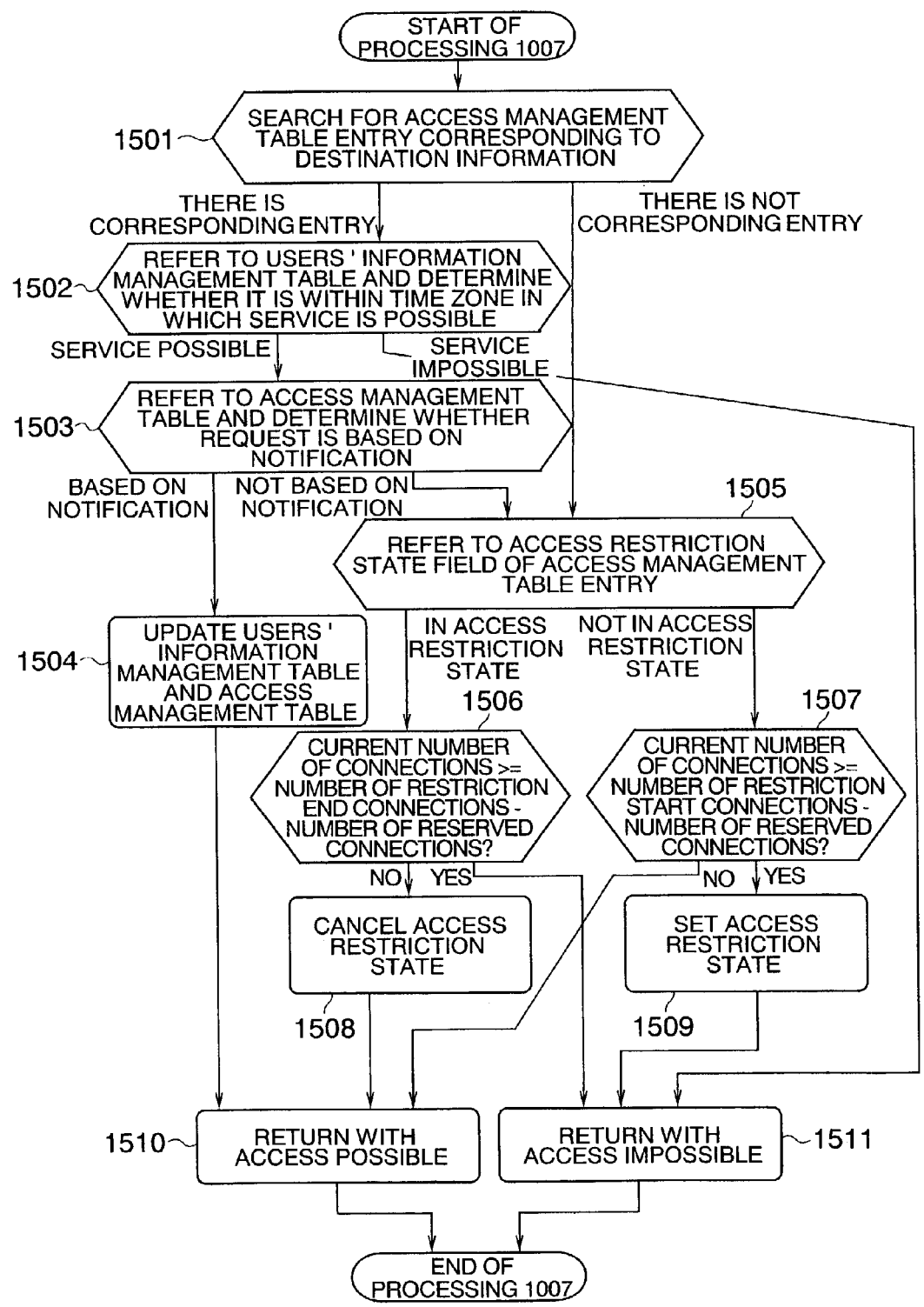
FIG. 7 is a flow diagram of access decision processing conducted in processing 1007 in FIG. 4, which relates to access management processing according to an embodiment.

FIG. 7 is a processing flow diagram of an embodiment of the processing 1007 in FIG. 4, in which the access management unit 13 makes the decision as to whether the access is possible.

First, the access management unit 13 searches for an access management table entry 2101 corresponding to destination information 51 delivered from the connection establishment unit 11 (processing 1501).

If there is a corresponding entry, then the access management unit 13 refers to the service provision time information field 2109, and determines whether service can be provided (processing 1502).

If it is determined in processing 1502 that service can be provided, then the access management unit 13 refers to the destination URL access management table entry field 2212 of the users, information management table 22, the notification time field 2214, and the privileged service time zone field 2215, and determines whether the request is a request based on the notification 80 (processing 1503).

As for a user having the privilege 59 that is not zero, the access management unit 13 may judge the user to be a privileged user, proceed to processing 1510, and send a response to the connection establishment unit 11 to inform that the access is possible without being subject to access restriction.

If the request is determined in the processing 1503 to be a request 50 based on the notification 80, then the access management unit 13 refers to the destination URL access management table entry field 2212 of the users' information management table 22, and conducts processing to increase the content of the current connection number field 2103 of the entry 2101 in the access management table 21 by one and to decrease the content of the current reserving users' number field 2107 by one. Subsequently, on the basis of the value of the number of access times field 2207 and the value of the post-notification average access time field 2209, the access management unit 13 calculates a new value of the post-notification average access time field 2209, and updates the value of the post-notification average access time field 2209. Furthermore, the access management unit 13 updates the number of access times field 2207 as well (processing 1504).

Thereafter, the access management unit 13 sends a response to the connection establishment unit 11 to inform that the access is possible, and finishes the processing (processing 1510).

If it is determined in the processing 1502 that service cannot be provided, then the access management unit 13 sends a response to the connection establishment unit 11 to inform that the access is impossible, and finishes the processing (processing 1511).

If it is determined in the processing 1501 that there is not an access management table entry 2101 corresponding to the destination information 51, or if it is determined in the processing 1503 that the request 50 is not based on the notification 80, then the access management unit 13 refers to the access restriction state field 2106 of the access management table entry 2101 and determines whether the state is the access restriction state or the access restriction cancel state (processing 1505).

If it is determined in the processing 1505 that the state is the access restriction state, then the access management unit 13 compares the value of the current connection number field 2103 with a difference between the value of the access restriction end connection number field 2105 and the value of the current reserving users' number field 2107 (processing 1506).

If the value of the current connection number field 2103 is greater than or equal to the difference, then the access management unit 13 sends a response to the connection establishment unit 11 to inform that the access is impossible and finishes the processing (processing 1511).

If the value of the current connection number field 2103 is less than the difference, then the access management unit 13 sets the value of the access restriction state field 2106 to the cancel state in order to cancel the access restriction state (processing 1508).

Thereafter, the access management unit 13 sends a response to the connection establishment unit 11 to inform that the access is possible, and finishes the processing (processing 1510).

If it is determined in the processing 1505 that the state is not the access restriction state, then the access management unit 13 compares the value of the current connection number field 2103 with a difference between the value of the access restriction start connection number field 2104 and the value of the current reserving users' number field 2107 (processing 1507).

If the value of the current connection number field 2103 is greater than or equal to the difference, then the access management unit 13 sets the value of the access restriction state field 2106 to the access restriction state in order to change the state to the access restriction state (processing 1509). Thereafter, the access management unit 13 sends a response to the connection establishment unit 11 to inform that the access is impossible, and finishes the processing (processing 1511).

If the value of the current connection number field 2103 is less than the difference, then the access management unit 13 sends a response to the connection establishment unit 11 to inform that the access is possible, and finishes the processing (processing 1510).

Figure 8:
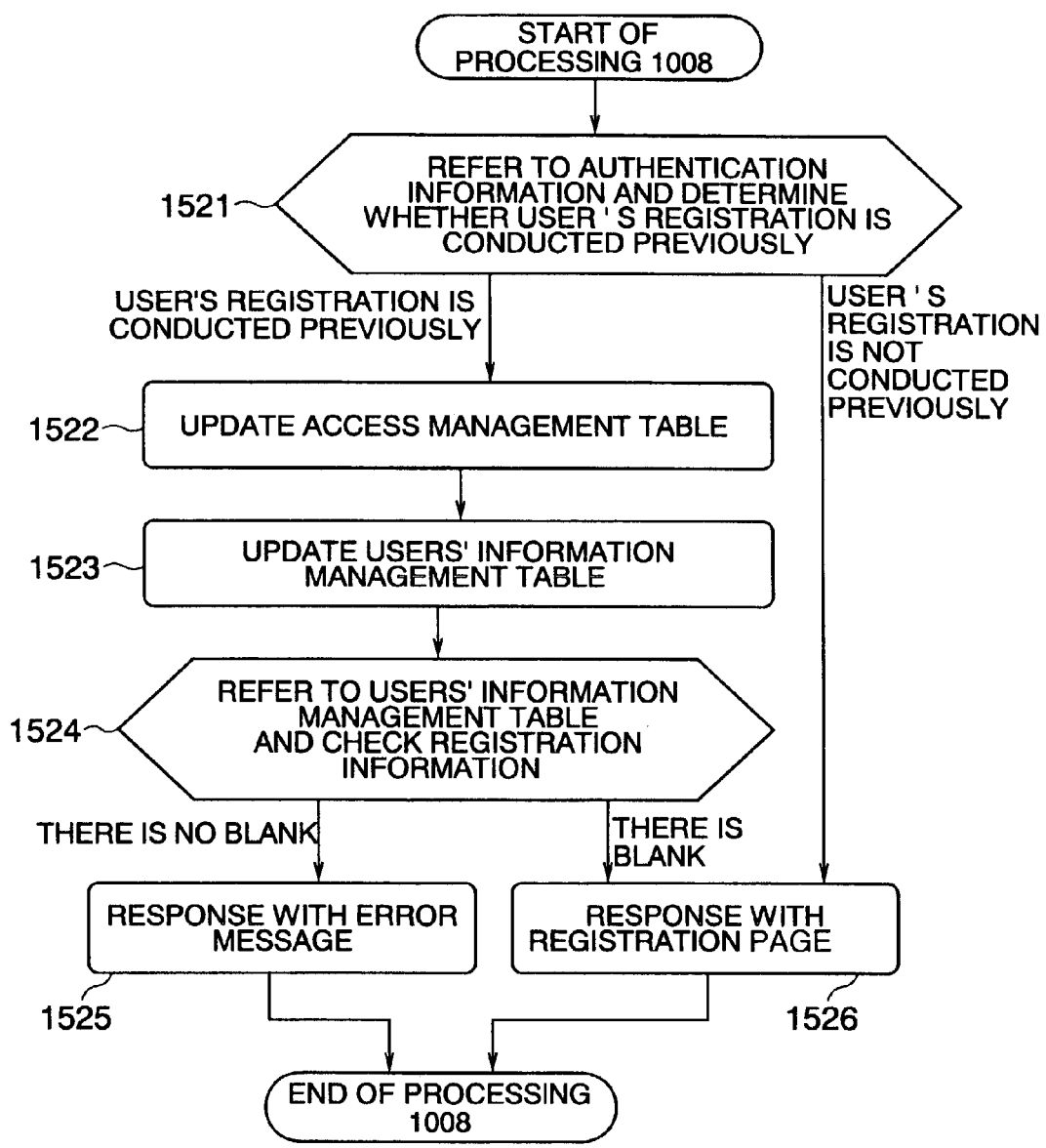
FIG. 8 is a flow diagram showing processing of registering users' information into a users' information management table conducted in processing 1008 in FIG. 4, which relates to access management processing according to an embodiment.

FIG. 8 is a processing flow diagram of an embodiment of the processing 1008 shown in FIG. 4 in which the access management unit 13 registers information in the users' information management table 22 and returns a response 60 to the client apparatus 1.

First, the access management unit 13 refers to the authentication information 52 delivered from the connection establishment unit 11, and determines whether the user's registration has already been conducted (processing 1521).

If the user's registration has not been conducted previously, then the access management unit 13 responds with a users' information registration page, requests the user to input the registration information (70), and finishes the processing (processing 1526).

If the user's registration has been conducted previously, then the access management unit 13 updates the waiting users' number field 2108 of the access management table entry 2101 corresponding to the destination information 51 (processing 1522).

Thereafter, the access management unit 13 updates the value of the access refusal time field 2208 of the entry 2201 of the user in the users' information management table 22 (processing 1523).

If any of the notification method field 2204, the notification destination field 2205, the desired service time zone field 2210, and the desired notification time field 2211 in the users' information management table 22 has not been registered previously, then the access management unit 13 responds with a users' information registration page, and requests the user to input the registration information 70 (processing 1526).

If registration has been conducted previously in the fields in the users' information management table 22, then the access management unit 13 sends an error message to the user as a response, and finishes the processing (processing 1525). The user who received the error message comes into a state in which the user is waiting for the notification 80.

Figure 6:
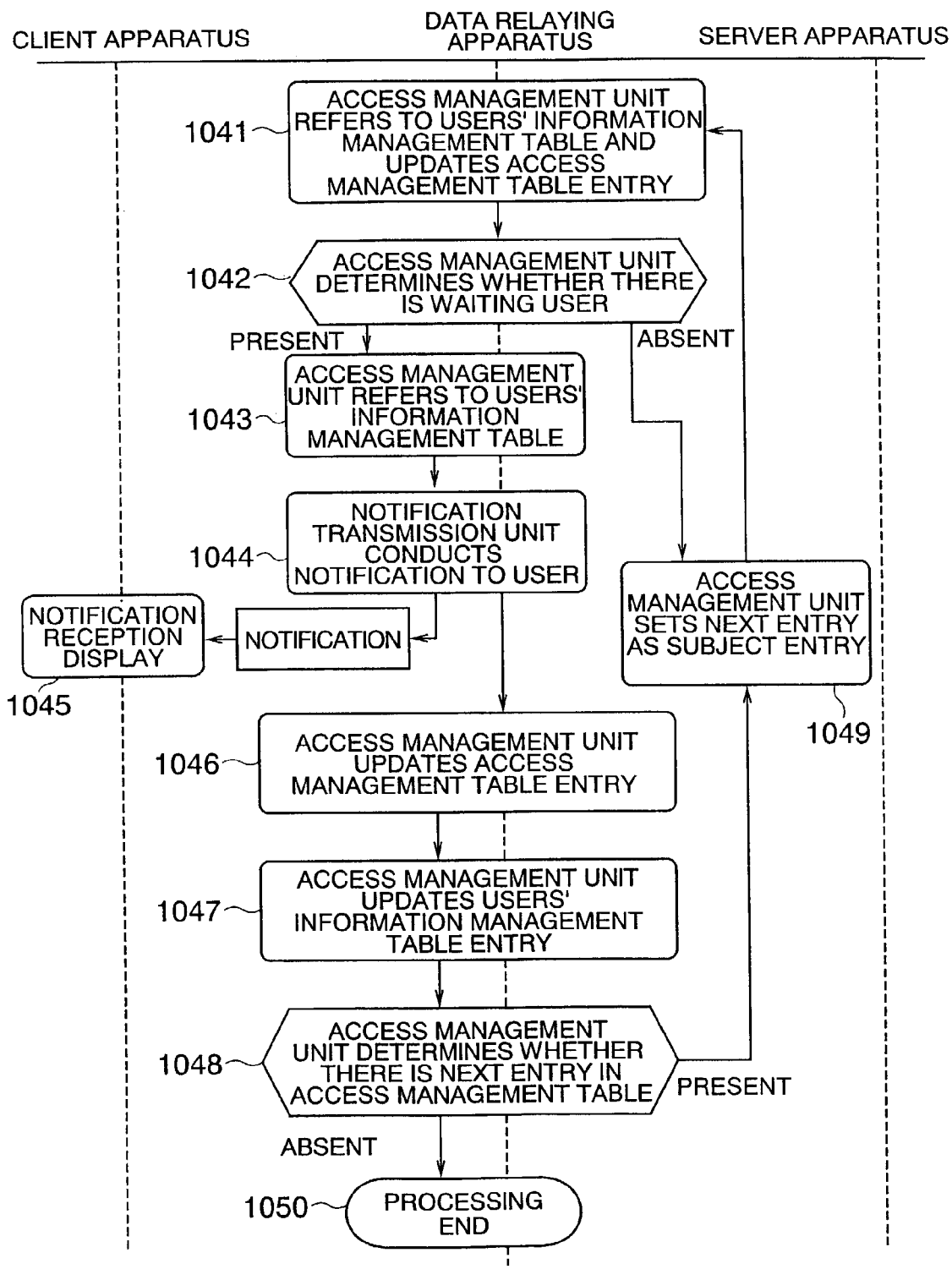
FIG. 6 is a processing flow diagram showing a flow of notification processing in a data relaying apparatus according to an embodiment.

FIG. 6 is a processing flow diagram showing a flow of notification processing conducted in the data relaying apparatus 3 of the present embodiment. This processing flow is executed at fixed time intervals.

The access management unit 13 periodically refers to the privileged service time zone field 2215 in the users, information management table 22, counts the number of users who should receive privileged service in the current time zone, and reflects its value in the current reserving users' number field 2107 of the access management table entry 2101 (processing 1041).

The access management unit 13 refers to the value of the waiting users' number field 2108 of an access management table entry 2101 that is the subject, and determines whether there is a waiting user (processing 1042).

If it is determined in the processing 1042 that there are no waiting users, then the access management unit 13 makes the next access management table entry 2101 a subject entry (processing 1049).

If it is determined in the processing 1042 that there is a waiting user, then the access management unit 13 refers to the users' information management table 22, and determines a user to be notified and the privileged service provision time zone 82. As for the user, the access management unit 13 refers to the desired service time zone field 2210 and the desired notification time field 2211, and searches users who desire the service at the present time, users who desire the notification, and users who desire to be provided with the service as soon as possible.

However, if the sum total of subject users is greater, in the state in which the access restriction has been canceled, than a difference between the value of the access restriction start connection number field 2104 and the value of the current reserving users' number field 2107, or if the sum total of subject users is greater, in the access restriction state, than a difference between the value of the access restriction end connection number field 2105 and the value of the current reserving users' number field 2107, then the access management unit 13 refers to the access refusal time field 2208, and selects refused users as users to be notified beginning with a user refused earlier. However, if the value of the number of times of notification field 2216 is greater than the value of the desired number of times of notification field 2213 or the number of rescheduling times 2111 of the access management table 21, then notification is not conducted.

The privileged service provision time zone 82 provides time having a value of immediate privileged service provision time 2110 in the range of the privileged service provision time 2110 in the users' information management table 22. However, the service provision time information 2109 is set. If the time is outside the service provision time, then notification is conducted to inform the user of the service provision time information 2109.

When determining the privileged service provision time zone 82, the access management unit 13 may refer to the post-notification average access time field 2209, and determine the privileged service provision time zone 82 by causing a delay equivalent to the value of the post-notification average access time field 2209 instead of using the immediate time (processing 1043).

The user's ID of the user which has become the subject in the processing 1043, and the notification 80 are delivered to the notification transmission unit 16 by the access management unit, and the notification transmission unit 16 notifies the pertinent user of the user's ID and the notification 80. The notification transmission unit 16 refers to the users' information management table, and transmits notification 80 to the client apparatus 1 of notification destination registered in the notification destination field 2205 by using a method registered in the notification method field 2204 for a user coinciding in the users' ID field 2202 (processing 1044).

The client apparatus 1 receives notification 80 from the data relaying apparatus 3 and provides a display for the user (processing 1045). The notification 80 at this time can be sent by using electronic mail or an instant message, which is an existing technique.

After sending the notification 80, the access management unit 13 decreases the value in the waiting users' number field 2108 by the number of notified users (processing 1046).

Thereafter, the access management unit 13 updates the notification time field 2214, the privileged service time zone field 2215, and the number of times of notification field 2216 of the users' information management table entry 2201 according to the content of the notification 80. Furthermore, the access management unit 13 refers to the privileged service time zone field 2215. If the service time zone is over, then the access management unit 13 clears values of the notification time field 2214 and the privileged service time zone field 2215 as time out processing (processing 1047).

The access management unit 13 determines whether there is the next entry in the access management table 21 (processing 1048).

If the next entry does not exist as a result of the processing 1048, then the processing is finished (processing 1050).

If the next entry exists as a result of the processing 1048, then the entry is set as the subject entry (processing 1049). After the subject entry has been altered in the processing 1049, the access management unit 13 returns to the processing 1041 and repeats similar processing.

According to the present embodiment, the data relaying apparatus monitors the number of connections to a server. If the number of connections has reached a certain fixed number or more, the data relaying apparatus refuses relaying of requests issued thereafter. Therefore, the server is prevented from falling in the down state at the time of access concentration. It thus becomes possible to provide users utilizing the system with stable service.

Furthermore, each user is provided with a privilege. Access from a user provided with a high privilege is not refused. As for a request of a user provided with a high privilege, therefore, service is provided with a high probability.

In addition, a user who has been refused the relaying of a request is notified of a time period during which the service can be provided and consequently provided with a chance of certainly receiving the service. As a result, it becomes possible to suppress repetition of re-execution conducted by the user.

As a message at the time when a request is refused, registration page is provided to register notification destination address or number, a notification method, a desired service time zone, desired service time, and a desired maximum number of notification times. Without conducting user's registration beforehand, therefore, the system can be introduced and notification according to the user's desire can be executed.

By using the present data relaying apparatus, it is possible to provide Web access service that has a method for conducting notification to a client apparatus and conducts processing of a request corresponding to the notification, in a privileged manner.

On the other hand, even in a situation that access concentration exceeding an estimate of a service provider occurs and it becomes impossible to provide service because of excessive load on the server apparatus, the service provider can provide stable service using the server apparatus, owing to the present embodiment. In addition, the service provider has a chance of providing users refused access as well with the service. Therefore, it becomes unnecessary for the service provider to estimate the server apparatus having higher performance than needed.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A data relaying apparatus for relaying data communication between a client apparatus and a server apparatus in a service system, the system including client apparatuses for issuing a service request to server apparatuses, and the server apparatuses for receiving a service request from the client apparatuses and for providing service, the data relaying apparatus comprising:

a unit that establishes a first connection between the client apparatus and the data relaying apparatus and receives the service request issued to the server apparatus by the client apparatus by using the first connection;

an access management table that manages a number of current second connections being established for each destination URL to a destination server apparatus and an access restriction state of each second connection for each said destination URL;

a users' information management table that manages a users' ID being assigned to a user, a notification method for representing a notification method to the user, a privilege of the user and an access state through each said second connection for each said destination URL;

an access management unit that determines whether or not the received service request to the destination server apparatus is acceptable based on the number of the second connections to the destination server apparatus, the number of the second connections to the destination server apparatus being indicative of load of the server apparatus;

a unit that establishes a further second connection between the data relaying apparatus and the destination server apparatus if the number of the second connections to the destination server apparatus is equal to or less than a predetermined number for each said destination URL, the number of the second connections to the destination server apparatus being indicative of the load of the server apparatus;

a unit that relays data communication between the client apparatus and the server apparatus by using the first connection and the second connection;

a unit that refuses the received service request and terminates the first connection if the number of the second connections to the destination server apparatus exceeds the predetermined number for each said destination URL, the number of second connections to the destination server apparatus being indicative of the load of the server apparatus, and removes the access states of the users' information management table;

a unit that notifies a user of the client apparatus for which the service request was refused, by using the notification method managed with the users' information management table, that another service request would be acceptable after the load of the server apparatus is decreased; and a unit that establishes the second connection to the destination server apparatus according to the privilege of the user in the users' information management table when access to the destination server apparatus becomes possible.

2. The data relaying apparatus according to claim 1, wherein in response to a service request issued by a user who has been notified that relaying is possible after a congestion state has been eliminated, the data relaying apparatus establishes a connection to the destination server apparatus in a privileged manner.

3. The data relaying apparatus according to claim 2, wherein a term is set to a period of time during which the connection to the user who has been notified by the data communication relaying apparatus is provided with privilege.

4. The data relaying apparatus according to claim 1, further comprising:
a unit that accepts specification of a desired service provision time zone from the user when the data relaying apparatus refused the service request from the user; and
a unit that notifies the user that service can be provided in the desired service provision time zone.

5. The data relaying apparatus according to claim 1, further comprising:
a unit that accepts time or a time period at which or during which the user desires to be notified, from the user; and
a unit that notifies the user at the desired time or during the desired time period.

6. The data relaying apparatus according to claim 1, further comprising:
a unit that accepts setting of a desired number of times of notification, from the user; and
a unit that sends notification to the user a number of times according to the desired number of times of notification.

7. The data relaying apparatus according to claim 1, further comprising a unit that secures a plurality of service provision time zones for the user and sends notification every service provision time zone.

8. The data relaying apparatus according to claim 1, further comprising:
a unit that sets a service provision term and/or a service provision time zone of the server apparatus if the data relaying apparatus refuses the service request from the user because the predetermined number of connections is exceeded; and
a unit that refuses relaying of the service request if the service request from the client apparatus is outside the setting.

9. The data relaying apparatus according to claim 1, further comprising:
a unit that sends a notification destination registration page for the client apparatus to the user when refusing the service request; and
a unit that accepts registration of a notification destination based on the registration page.

10. The data relaying apparatus according to claim 9, further comprising:
a unit that inquires the user about desired service time, desired notification time, or desired number of times of notification as registration information on the registration page; and
a unit that registers information provided from the user based on the inquiry.

11. The data relaying apparatus according to claim 1, further comprising:
a unit that determines privilege of the service request based on an address of the client apparatus, or a combination of an address of the client apparatus and an address of the destination server apparatus.

12. The data relaying apparatus according to claim 1, further comprising:
a unit that determines privilege of the service request based on authentication information of the user of the client apparatus provided together with the service request of the client apparatus.

13. The data relaying apparatus according to claim 1, further comprising:
a unit that determines privilege of the service request based on authentication information of the user of the client apparatus provided together with the service request of the client apparatus and an entry for the user in the access management table.

14. The data relaying apparatus according to claim 1,
wherein the access management table registers current connection numbers for representing the number of requests being relayed to the server apparatuses, access restriction connection numbers for representing the number of connections for which an access restriction state is started or ended, and a waiting user's number for representing the number of users who are refused access and wait for notification, and
wherein at least the current connection numbers in the access management table are renewed when the first connection or the second connection was disconnected.

15. The data relaying apparatus according to claim 1, further comprising:
a user's information management table that registers at least users ID identifying each user, the notification method, a notification destination of the user, and a privilege representing privilege of the user,
wherein the notification method is obtained by referring to the user's information management table.

16. A Web access service system comprising:
a plurality of client apparatuses that issue a service request;
a plurality of server apparatuses that receive the service request from the client apparatuses and that provide service; and
a data relaying apparatus that relays data communication between a client apparatus and a server apparatus;
wherein the data relaying apparatus comprises:
a unit that establishes a first connection between the client apparatus and the data relaying apparatus and receives the service request issued to the server apparatus by the client apparatus by using the first connection;
an access management table that manages a number of current second connections being established for each destination URL to a destination server apparatus and an access restriction state of each second connection for each said destination URL;
a users' information management table that manages a users' ID being assigned to a user, a notification method for representing a notification method to the user, a privilege of the user and an access state through each said second connection for each said destination URL;
an access management unit that determines whether or not the received service request to the destination server apparatus is acceptable based on the number of the second connections to the destination server apparatus, the number of the second connections to the destination server apparatus being indicative of load of the server apparatus;
a unit that establishes a further second connection between the data relaying apparatus and the destination server apparatus if the number of the second connections to the destination server apparatus is equal to or less than a predetermined number for each said destination URL, the number of the second connections to the destination server apparatus being indicative of the load of the server apparatus;
a unit that relays data communication between the client apparatus and the server apparatus by using the first connection and the second connection;

a unit that refuses the received service request and terminates the first connection if the number of the second connections to the destination server apparatus exceeds the predetermined number for each said destination URL, the number of second connections to the destination server apparatus being indicative of the load of the server apparatus, and removes the access states of the users' information management table;

a unit that notifies a user of the client apparatus for which the service request was refused, by using the method managed with the users' information management table, that another service request would be acceptable after the load of the server apparatus is decreased; and a unit that establishes the second connection to the destination server apparatus according to the privilege of the user in the users' information management table when access to the destination server apparatus becomes possible, wherein the service request corresponding to the notification is subject to processing in a privileged manner.

17. A data relaying method for relaying data communication between a client apparatus and a server apparatus in a service system, the system including client apparatuses for issuing a service request to server apparatuses, and the server apparatuses for receiving a service request from the client apparatuses and for providing service, comprising:

establishing a first connection between the client apparatus and the data relaying apparatus and receiving the service request issued to the server apparatus by the client apparatus by using the first connection;

managing a number of current second connections being established for each destination URL to a destination server apparatus and an access restriction state of each second connection for each said destination URL;

managing a users' ID being assigned to a user, a notification method for representing a notification method to the user, a privilege of the user and an access state through each said second connection for each said destination URL;

determining whether or not the received service request to the destination server apparatus is acceptable based on the number of the second connections to the destination server apparatus, the number of the second connections to the destination server apparatus being indicative of load of the server apparatus;

establishing a further second connection between the data relaying apparatus and the destination server apparatus if the number of the second connections to the destination server apparatus is equal to or less than a predetermined number for each said destination URL, the number of the second connections to the destination server apparatus being indicative of the load of the server apparatus; relaying data communication between the client apparatus and the server apparatus by using the first connection and the second connection;

refusing the received service request and terminating the first connection if the number of the second connections to the destination server apparatus exceeds the predetermined number for each said destination URL, the number of second connections to the destination server apparatus being indicative of the load of the server apparatus and removing the access states;

notifying a user of the client apparatus for which the service request was refused, by using the notification method that another service request would be acceptable after the load of the server apparatus is decreased; and establishing the second connection to the destination server apparatus according to the privilege of the user when access to the destination server apparatus becomes possible.

18. The data relaying method according to claim 17, wherein in response to a service request issued by a user who has been notified that relaying is possible after a congestion state has been eliminated, the data relaying apparatus establishes a connection to the destination server apparatus in a privileged manner.

19. The data relaying method according to claim 17, further comprising:

registering current connection numbers for representing the number of requests being relayed to the server apparatuses, access restriction connection numbers for representing the number of connections for which an access restriction state is started or ended, and a waiting user's number for representing the number of users who are refused access and wait for notification, wherein at least the current connection numbers are renewed when the first connection or the second connection was disconnected.

20. The data relaying apparatus according to claim 17, further comprising:

providing a user's information management table that registers at least users ID identifying each user, the notification method, a notification destination of the user, and a privilege representing privilege of the user, wherein the notification method is obtained by referring to the user's information management table.

* * * * *